March 15, 1932.  F. A. STUTSMAN ET AL  1,849,855
SPARE TIRE CARRIER
Filed Dec. 11, 1929   2 Sheets-Sheet 1

Inventors
F. A. Stutsman
James Olsen

By Clarence A. O'Brien
Attorney

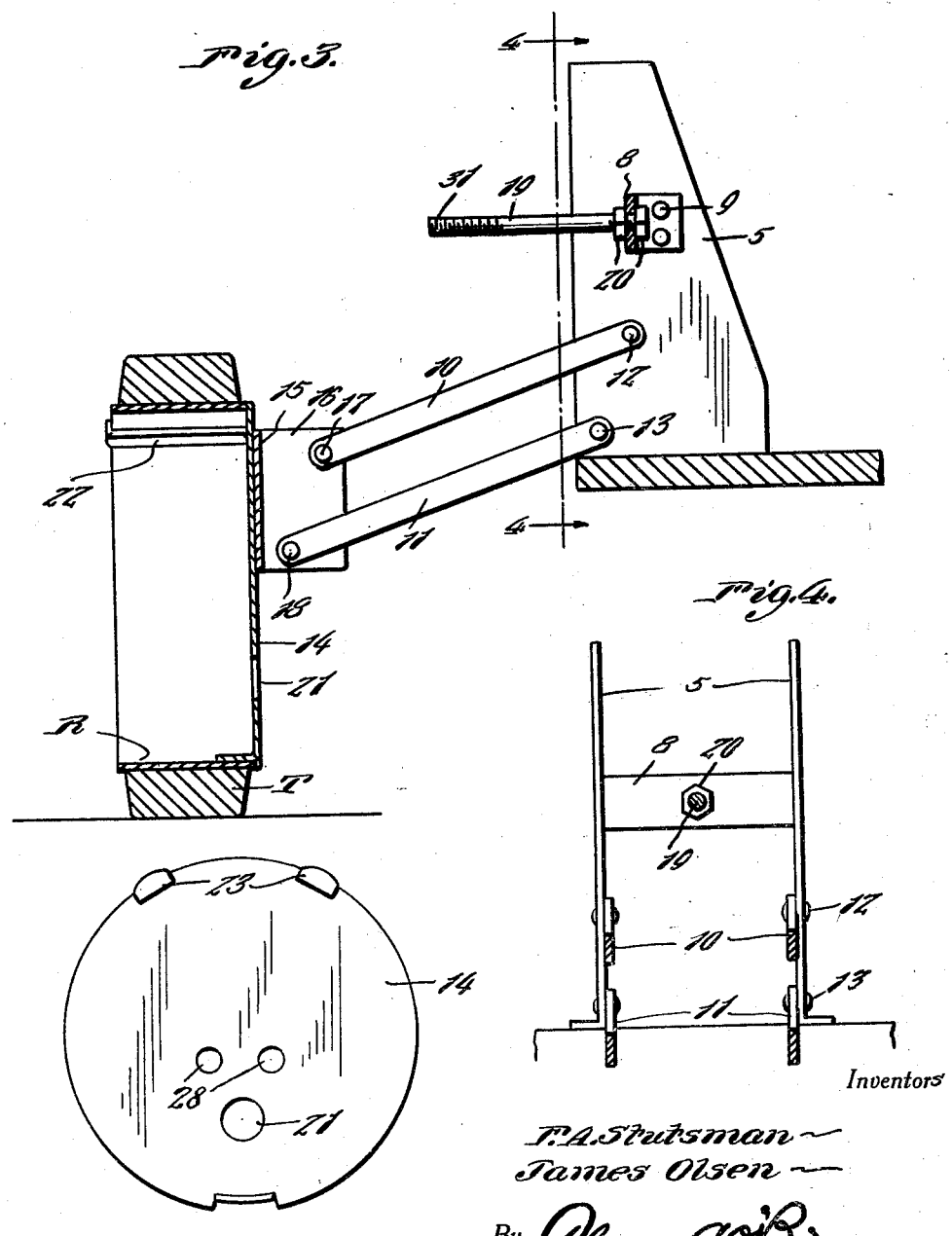

Patented Mar. 15, 1932

1,849,855

UNITED STATES PATENT OFFICE

FRED A. STUTSMAN AND JAMES OLSEN, OF DIVERNON, ILLINOIS

SPARE TIRE CARRIER

Application filed December 11, 1929. Serial No. 413,285.

This invention relates to tire carriers, and has more particular reference to a carrier especially adapted for use in connection with vehicles for carrying a spare tire in a novel and practical manner.

A still further object of the invention is to provide a spare tire carrier for vehicles, which may be secured to the rear body part of the vehicle, and wherein the tire carrier comprises a stationary part and a swingable tire carrying part whereby the tire carrying part may be lowered or swung from its usual position for disposing the spare tire carried thereby upon the ground to facilitate removal of the spare tire from the carrier.

A still further object of the invention is to provide a tire carrier of this character which is simple in construction, consisting of but comparatively few parts, strong, durable, thoroughly reliable, practical, and efficient in operation, and otherwise well adapted to the purpose designed.

Other objects and advantages of the invention will become apparent during a study of the following description taken in connection with the accompanying drawings wherein:—

Fig. 3 is a view similar to Fig. 1 and showing the tire carrying part swung downwardly from its normal carrying position for disposing the tire carried thereby upon the ground, whereby ready removal of the spare tire from the carrying part may be attained.

Fig. 4 is a detail sectional view taken substantially on the line 4—4 of Fig. 3.

Fig. 5 is a front elevational view of the swingable tire carrying part.

Figure 1:
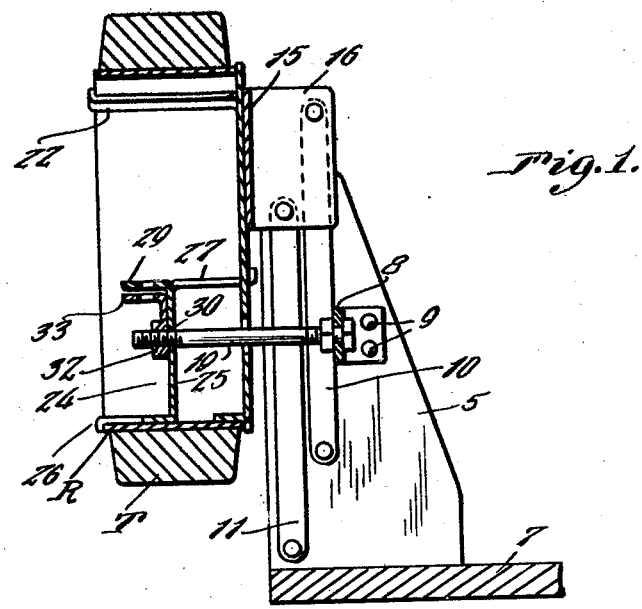
Figure 1 is a detail view partly in section and partly in elevation of a spare tire carrier embodying the features of the present invention, the tire carrying part of the apparatus being shown in its normal carrying position.
Figure 2:
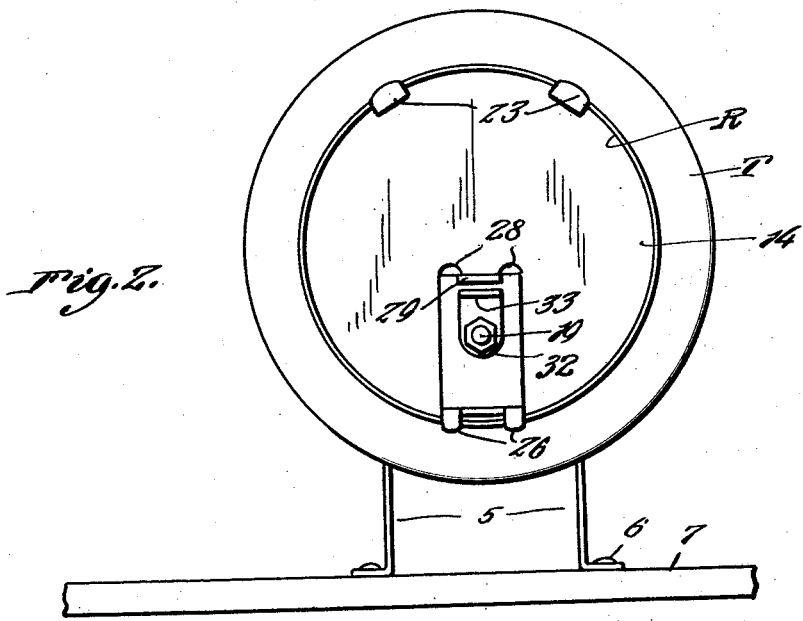
Fig. 2 is a front elevational view thereof.

With reference more in detail, to the drawings, it will be seen that our improved spare tire carrier comprises a pair of spaced parallel bracket plates 5—5, bolted or otherwise secured at their lower ends as at 6, to a supporting base or platform 7, which base or platform may be an integral part of the rear body portion of the vehicle.

The plates 5—5 may be of angular construction as indicated to advantage in Fig. 3 and are secured together intermediate their ends by a cross member 8 which cross member 8 has its end bolted or otherwise secured to the respective plates 5 as at 9.

Secured to each of the plates 5 adjacent their lower ends is a pair of links 10 and 11, which links are pivoted to the respective plates as at 12 and 13 respectively. A movable tire carrying member embodies a substantially circular plate 14 formed of metal or any other suitable material, and secured to the rear face of the plate 14, adjacent the upper end of the plate, and extending transversely of the plate is a substantially U-shaped member 15.

This U-shaped member 15 has the crown thereof bolted, welded or otherwise secured to the plate 14. The links 10 and 11 of the respective pairs of links, are pivoted as at 17 and 18 to the ends 16 of the U-shaped member 15, as shown to advantage in Fig. 3, so that obviously, the tire carrying plate 14 may be swung upwardly in parallelism to the forward longitudinal edges of the plates 5 as shown to advantage in Fig. 1, or may be swung downwardly to that position shown in Fig. 3, away from the plates 5.

For retaining the tire plate 14 in that position shown in Fig. 1, there is provided an elongated clamping bolt 19, which bolt 19 has one end thereof secured to an intermediate portion of the cross member 8 thru the medium of lock nuts 20.

The bolt 19 may be of any suitable length, and extends forwardly from the member 8 between the attaching plates 5. The tire carrying plate 14 adjacent its lower peripheral edge is provided with a suitable opening 21 through which said bolt 19 is adapted to extend when the plate 14 has been swung to that position shown in Fig. 1, or to its raised position.

The plate 14 at the upper edge thereof has extending forwardly therefrom a pair of spaced co-extensive supporting arms 22. The supporting arms 22 at their outer free ends terminate in upwardly directed terminals forming jaws 23.

A tire rim R carrying a tire T, which tire T for sake of example, is shown as a solid tire, such as is used for motor trucks, may be suspended from the arms 22, the jaws 23 engaging with the outer end or peripheral edge of this tire carrying rim R for retaining said rim on the arms 22 between said jaws 23 and the adjacent portion of the marginal edge of the plate 14 as shown to advantage in Fig. 3.

For securing the lower portion of the tire carrying rim R to the tire carrying plate 14, there is provided a retaining member designated generally by the reference character 24, and the retainer member comprises a plate-like body portion 25, which plate-like body portion 25 at one end thereof, is provided with a pair of laterally extending jaws 26, which jaws 26 extend in spaced parallelism from one side of the plate 25 and at right angles thereto, for engagement with the outer edge of the tire carrying rim R as shown to advantage in Fig. 1.

Extending from the upper end of the body portion or plate 25 is a second pair of spaced parallel co-extensive jaws 27, which jaws 27 extend in an opposite direction to the jaws 26, and the terminals of the jaws 27 are adapted to be passed through suitable openings 28 provided therefor in the plate 14, the terminals of the jaws engaging the rear face of plate 14.

The body portion 25 of the retainer member 24 at said upper end, has formed integrally therewith and extending at right angles thereto, and in an opposite direction to the jaws 27, an apertured lug 29. The plate-like body portion 25 intermediate its ends is provided with a bolt receiving opening 30, which opening 30 is disposed in alinement with the opening 21 of the plate 14, and through the opening 30, is extended the threaded end portion 31 of the bolt 19.

A retaining nut 32 is threadedly engaged with the threaded end 31 of the bolt 19, and will abut the body member of the retainer 24 to prevent casual swinging movement of plate 14, thus retaining the parts in the position shown in Fig. 1.

The nut 32 is provided with an angularly shaped lateral extension 33 which extension 33 is apertured to register with the aperture in the lug 29, and obviously, any suitable retaining element may be passed through the registering apertures of the extension 33 and lug 29 for securing said nut 32 against casual displacement, as for example the hasp of a suitable lock may pass through the registering openings, thus insuring against tampering or removal of the nut 32 by unauthorized persons.

Manifestly, under normal circumstances, the tire carrier will be disposed in the position shown in Fig. 1, that is, with the tire carrying plate 14 in a raised position for supporting the spare tire on the rear of the vehicle above the ground. When it is desired to remove the spare tire from the carrier, the nut 32 may be removed from the bolt 19, followed by a removal of the retaining element 24, when the tire carrying plate 14 may be swung downwardly away from the bracket plates 5 for disposing the spare tire in a vertical position on the ground.

Manifestly, the retaining element 24 having been removed, it would require but a short period of time to remove the rim from out of engagement with the arms 22.

It is thought from the foregoing description taken in connection with the accompanying drawings, that a clear understanding of the operation, construction, utility and advantages of a tire carrier as embodying the features of this invention will be had by those skilled in the art without a more detailed description thereof.

Even though we have herein shown and described the preferred embodiment of our invention, it is to be understood that the same is susceptible to changes fully coming within the spirit and scope of the invention as herein described, and the scope of the appended claims.

Having thus described our invention, what we claim as new is:—

1. A spare tire carrier for automobiles comprising a vertical plate, means for securing said vertical plate to a rear body part of a motor vehicle, links pivoted at one end to said plate, a second plate pivotally secured to the other end of said links, a pair of spaced co-extensive jaw members extending forwardly from the upper edge of said second plate for engagement with a tire carrying rim, a retaining element embodying a pair of jaw members engageable with the tire carrying rim at the lowermost portion of said rim, and means carried by said first-mentioned plate and engageable with said retaining element, for securing said jaws in gripping engagement with said tire carrying rim for securing the rims between said jaws and the adjacent lower edge portions of the second-mentioned plate.

2. A spare tire carrier for automobiles comprising a vertical plate, means for securing said vertical plate to a rear body part of a motor vehicle, links pivoted at one end to said plate, a second plate pivotally secured to the other ends of said links, a pair of spaced co-extensive jaw members extending forwardly from the upper edge of said second plate for engagement with a tire carrying rim, a retaining element embodying a pair of jaw members engageable with the tire carrying rim at the lowermost portion of said rim, means carried by said first-mentioned plate and engageable with said retaining element, for securing said jaws in gripping engagement with said tire carrying rim for securing the rim between said jaws and the adjacent lower edge portion of the second-mentioned plate, said last mentioned means including means cooperable with said retaining element, whereby the jaws of said retaining element may be maintained in engagement with said tire carrying rim against unauthorized removal.

3. A tire carrier comprising a plate, a link pivotally connected to said plate and to a relatively stationary support whereby said plate and said link may be swung to a position parallel to one another, a tire rim engaging and supporting means carried by said plate, means for retaining said plate and link in parallelism, and against unauthorized displacement, said last mentioned means including means engageable with said plate and tire rim for retaining the latter against unauthorized removal from the said tire rim supporting and engaging means carried by said plate.

4. A spare tire carrier for vehicles comprising a pair of spaced parallel plates adapted to be secured to a body portion of the vehicle, a tire carrying plate, opposed pairs of links pivotally connecting said tire carrying plate with the first mentioned plates, whereby said tire carrying plate may be swung upwardly to a position paralleling the forward edges of the first mentioned plates, or may be swung downwardly away from said first mentioned plates, a pair of stationary jaws carried by said tire carrying plate for supporting engagement with a tire rim, a cross member connecting said pair of parallel plates, a securing bolt extending forwardly from said cross member and adapted to extend through an aperture provided in said tire carrying plate when the latter is swung upwardly to its first mentioned position, and a retaining element embodying a body plate having an aperture for accommodating the forward end of said bolt, jaw members extending angularly from said body plate for engagement with the tire rim and the tire engaging plates, and a retaining nut threadedly engaged with the bolt and engageable with the body plate for retaining the last mentioned jaws in engagement with the tire carrying rim.

In testimony whereof we affix our signatures.

FRED A. STUTSMAN.
JAMES OLSEN.